Patented Oct. 31, 1922.

1,434,070

UNITED STATES PATENT OFFICE.

WILLIAM B. SMITH, OF WASHINGTON, DISTRICT OF COLUMBIA, ASSIGNOR, BY DIRECT AND MESNE ASSIGNMENTS, OF ONE-THIRD TO MABEL O. SMITH, ONE-THIRD TO G. E. BEECHWOOD, AND ELEVEN NINETY-SIXTHS TO R. C. McCANDLISH, ALL OF WASHINGTON, DISTRICT OF COLUMBIA, AND SEVEN THIRTY-SECONDS TO R. C. McCANDLISH AS TRUSTEE FOR HENRY YEAGER McCANDLISH.

FROZEN FOOD PRODUCT.

No Drawing. Application filed April 3, 1922. Serial No. 549,201.

*To all whom it may concern:*

Be it known that I, WILLIAM B. SMITH, of Washington, in the District of Columbia, have invented certain new and useful Improvements in Frozen Food Products; and I do hereby declare the following to be a full, clear, and exact description of the invention, such as will enable others skilled in the art to which it appertains to make and use the same.

In the manufacture of known ice cream, animal fat, such as milk and cream, is used as the essential base and because of the cost of such animal fats production of ice cream including these ingredients is expensive and the selling price must necessarily be maintained at a figure which is in excess of a reasonable charge for an edible luxury. Ice cream as now made is essentially a mixture of from twelve to sixteen per cent fat, of an animal nature; from fifteen to twenty per cent sugar, (from three-fourths to four-fifths of which is cane sugar or sucrose, the balance being lactose or milk sugar); from two to five per cent casein; from five-tenths to one and two-tenths per cent ash or mineral matter; flavor, and the balance water.

The object of the present invention is the production of a composition of matter in all respects similar to ice cream as it is now generally made in accordance with the formula before set forth with the exception that vegetable fats and oils are used in place of the animal fats, the food value of vegetable fat being the same as that of the animal fat, such composition of matter when frozen having every outward appearance of ice cream and being a wholesome and refreshing article, the composition being far less costly to prepare than frozen products containing animal fats or oils.

My improved mix has as its essential base a vegetable fat or oil, and it is found in practice that cotton seed oil is well adapted for such purpose. The other ingredients used in the preparation of the mix are sugar, casein, sodium bicarbonate, water and such flavoring material as may be desired. The ingredients of the composition are preferably in the proportions of—

150 grams vegetable fat.
    200 grams sugar.
    40 grams casein.
    10 grams sodium bicarbonate.
    650 grams water.
    Flavoring substance.

In the manufacture of ice cream, the casein is to a considerable degree responsible for the emulsified character of the milk and cream, and it also acts to a large extent as a binder to prevent separation. It is well known that gum tragacanth is capable of producing emulsions, and acts as a binder, and such gum or other perfectly wholesome vegetable gums may be employed in lieu of casein.

It is preferable that the compound be produced by first softening the casein or vegetable gum with water in the presence of the sodium bicarbonate. When the mixture becomes mucilaginous, the sugar is added with more water and the whole intimately stirred until the sugar is dissolved. The vegetable oil (or fat in a melted state) is added and the whole is then subjected to violent agitation to reduce the fat particles to an infinitesimal size so that the finished product shall be of a smooth texture. The balance of the water is then added and the whole flavored to suit. So prepared the mix is again agitated and then frozen in the usual manner.

It is understood that while cotton seed oil is herein set forth as a vegetable fat for use as the essential base of my improved compound, other vegetable fats or oils may be used with equally advantageous results, and further that in the production of a mix for a frozen food product I may employ ingredients of like or similar character to those set forth herein in connection with the vegetable oil or fat, and may dispense with such as play but relatively small parts in the food value of the product.

I claim as my invention:

1. A mix for a frozen article of manufacture, including as its essential base an edible vegetable fat in lieu of animal fat, casein and sodium bicarbonate.

2. A mix for a frozen article of manufacture composed of, and in the approximate proportions stated, 150 grams vegetable fat, 200 grams sugar, 40 grams casein, 10 grams sodium bicarbonate, 650 grams water, flavoring substance.

3. In the preparation of a mix for a frozen article of manufacture, first softening casein with water in presence of the sodium bicarbonate and forming a mucilaginous mixture, then adding sugar and more water, stirring the mixture so formed until the sugar is dissolved, adding vegetable fat in a melted state, subjecting the whole to violent agitation, adding a further quantity of water and finally adding a flavoring substance.

In testimony whereof I have signed this specification.

WILLIAM B. SMITH.